June 5, 1962 W. T. RENTSCHLER 3,037,439
PHOTOGRAPHIC CAMERA HAVING AUTOMATIC EXPOSURE SETTING MEANS
Filed Jan. 17, 1961 3 Sheets-Sheet 1
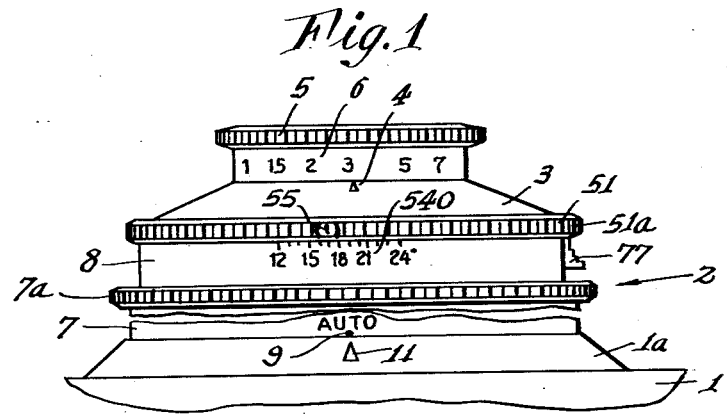
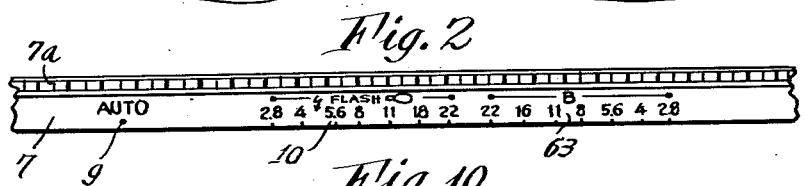
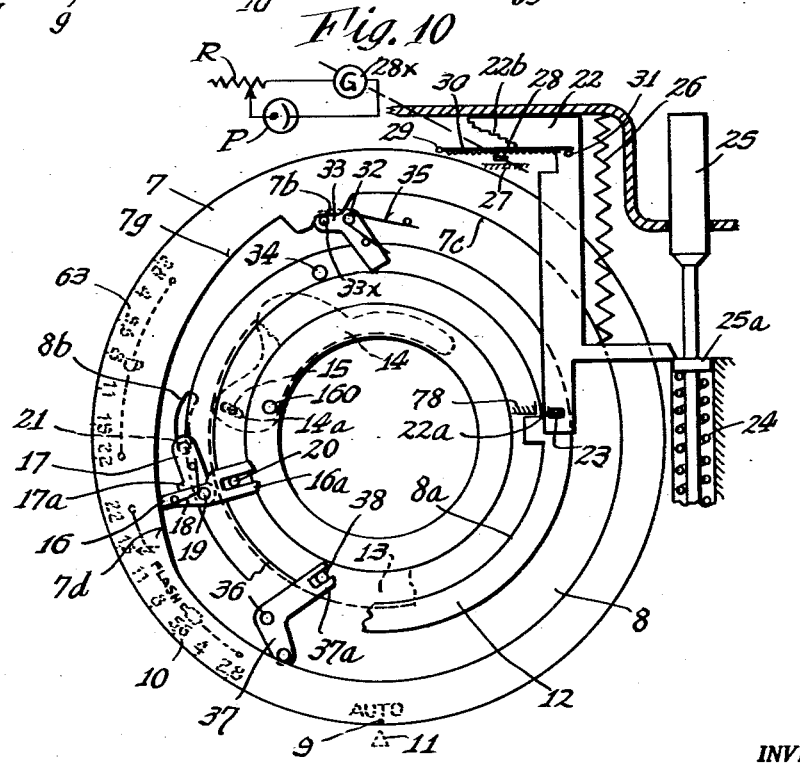
INVENTOR.
Waldemar T. Rentschler
BY
March and Curtiss
ATTORNEYS June 5, 1962 W. T. RENTSCHLER 3,037,439
PHOTOGRAPHIC CAMERA HAVING AUTOMATIC EXPOSURE SETTING MEANS
Filed Jan. 17, 1961 3 Sheets-Sheet 2
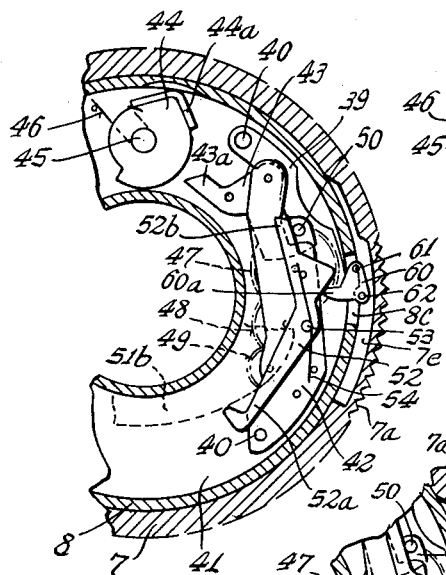
Fig. 5
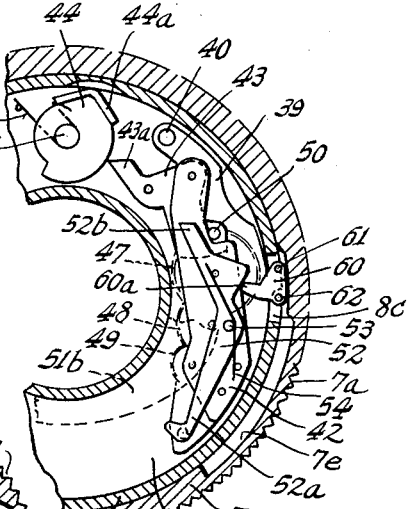
Fig. 6
Fig. 7
Fig. 3
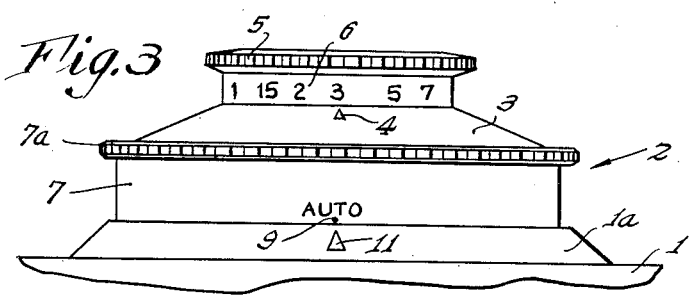
Fig. 4
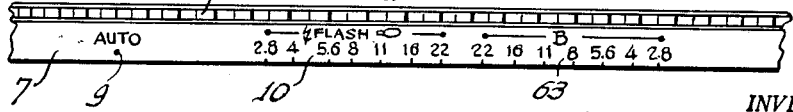
INVENTOR.
Waldemar T. Rentschler
BY
March and Curtiss
ATTORNEYS June 5, 1962 W. T. RENTSCHLER 3,037,439
PHOTOGRAPHIC CAMERA HAVING AUTOMATIC EXPOSURE SETTING MEANS
Filed Jan. 17, 1961 3 Sheets-Sheet 3
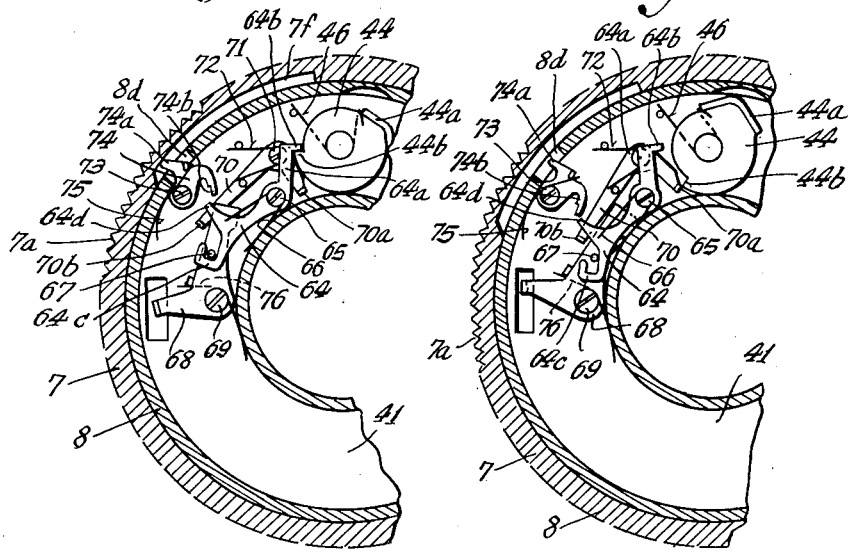
INVENTOR.
Waldemar T. Rentschler
BY
March and Curtiss
ATTORNEYS

United States Patent Office 3,037,439
Patented June 5, 1962

3,037,439
PHOTOGRAPHIC CAMERA HAVING AUTOMATIC EXPOSURE SETTING MEANS
Waldemar T. Rentschler, Calmbach (Enz), Germany, assignor to Alfred Gauthier, G.m.b.H., Calmbach (Enz), Germany, a corporation of Germany
Filed Jan. 17, 1961, Ser. No. 83,212
Claims priority, application Germany Jan. 21, 1960
2 Claims. (Cl. 95—64)

This invention relates to photographic cameras of the type equipped with automatic exposure setting devices which are responsive to existing light conditions such as light on the subject to be photographed, and more particularly to cameras of this type wherein successful exposures may in general be made with the camera manually held, by correlating various particular or specific shutter speeds or exposure times with the various film sensitivities available.

Cameras of the above type have the special advantage that pictures may be taken with permanent light, i.e., especially daylight, using a method of operating the camera which does not require any mental work or calculation. This advantage is due to the fact that both the shutter speed or exposure time factor and the diaphragm factor need no longer be taken into consideration by the photographer, and that instead there is merely required an adjustment for film sensitivity, involving adjusting a single setting member, which moreover need be adjusted only when using a film of different sensitivity from the preceding film. The fact that the shutter speed or exposure time is limited to those values which are suitable for taking photographs with the camera manually held further insures that the exposures will not be spoiled by slight movement of the camera, and that the exposures will be satisfactory even with moving objects present in the picture, this being true for each different film sensitivity.

An object of the present invention is to provide a novel and improved camera of the above described type which, while retaining the above mentioned advantages also makes it possible to effect exposures using both permanent light or daylight and flash lighting, utilizing simple and uncomplicated structures and employing a simple and easily understood mode of operation, which may be easily and quickly carried out.

In accomplishing the above, in accordance with the invention, there is provided a manually operable switch or selector device which may be placed in either "automatic" or "flash" settings. In conjunction with such selector device a mechanism is provided which is responsive to the "flash" setting, and which effects a shutter speed or exposure time which is suitable for taking flash exposures, as for example a shutter speed of 1/30 second. Also, such setting of the selector device connects it with the diaphragm adjusting mechanism whereby manual diaphragm settings are possible, there being an indicator on the selector device which is movable over a diaphragm scale to indicate the various diaphragm values in making this manual adjustment.

A camera as thus provided in accordance with the invention has the special advantage that there is possible a wide range of use, since photographs may be taken not only using permanent or daylight illumination in conjunction with the automatic setting mechanism, but also the taking of photographs is possible utilizing flash illumination. The selection of which types of photographs are to be taken, and the setting or adjustment of the shutter speed and diaphragm in the case where flash photographs are desired, is effected by means of a single member constituting a manually operable selector device. To effect this selection but a single manipulation is required, by means of which the selector mechanism is actuated, depending on the kind of exposure desired, either to an "automatic" position or else to an adjusting range which is identified as effecting flash exposures. This results in a particularly simple and uncomplicated, easily understandable and rapid mode of operation of the camera.

An extension of the useful range of the camera, in accordance with the invention, is obtained while retaining the above mentioned advantages by arranging the selector so that it can be set or placed at an additional, further position ("B") which is different from the automatic and flash positions, and which renders operative a well-known device for obtaining B-exposures while at the same time the diaphragm is conditioned for manul setting and may be adjusted by means of the selector member over a setting range identified by the diaphragm scale.

A camera constructed in the above manner can also be used in those cases where the prevailing light conditions make it impossible to carry out an exposure with the shutter speed or exposure time controlled automatically by the automatic setting mechanism. The setting of the camera to make an exposure where the light is not suitable for automatic regulation requires no know-how on the part of the operator as to the selection of functions, since all of the required processes, namely the switching-off of the automatic diaphragm setting device, the conditioning of the diaphragm setting device for manual adjustment, and the act of rendering operative the device for obtaining "B" exposures are all carried out automatically by merely placing the selector in the "B" position.

Two embodiments of the invention are shown in the accompanying drawings.

FIG. 1 is a fragmentary top plan view of a portion of a photographic camera having an intra-lens shutter constructed in accordance with the invention. The shutter comprises an exposure time or speed setting member that serves as a film-sensitivity setting member and which is settable with respect to a film sensitivity scale, and comprises further a switching or selector device. The latter is shown in its automatic position, indicated by the word "auto."

FIG. 2 is a fragmentary developmental view illustrating the arrangement of the setting marks for effecting automatic and non-automatic or flash settings of the camera, and also B settings. This figure thus is illustrative of the scale provided on the outer periphery of the selector member.

FIG. 3 is a view similar to that of FIG. 1, but illustrating another embodiment comprising a photographic camera having an intra-lens shutter structure constructed in accordance with the invention. In contrast to the camera structure shown in FIGS. 1 and 2, there may be provided a film sensitivity member (not shown) at the front side of the camera housing in a well-known manner, per se. In response to the selector being placed in its "automatic" position, the shutter can be set at a specific exposure time which is suitable for the taking of photographs with the camera manually held.

FIG. 4 is a fragmentary development of the selector shown in FIG. 3, illustrating the setting marks for automatic and non-automatic settings of the camera, the latter including both the "flash" setting and the "B" setting.

FIG. 5 is a fragmentary transverse sectional view through the intra-lens shutter structure shown in FIG. 1 looking rearward to reveal interior details, the front cover plate being removed. The figure illustrates the cooperation of the speed setting device of the shutter structure and the film sensitivity setting member, both being co-operable with the selector member. The latter is illustrated in the "automatic" position.

FIG. 6 is a view similar to that of FIG. 5, but showing the selector member set at the non-automatic setting whereby the diaphragm may be manually adjusted.

FIG. 7 is a fragmentary view similar to that of FIGS. 5 and 6 but showing a lesser portion of the shutter structure, this figure revealing the shutter speed adjusting device which is controlled by the selector member. The said member is, in this figure, placed in the "automatic" position.

FIG. 8 is a fragmentary transverse sectional view looking rearward through the intra-lens shutter structure of FIGS. 1 and 3. The front coverplate is removed in this figure, and there is illustrated the co-operation of the device for effecting "B" photographs which is built into the shutter, with the selector and with the main driving member of the shutter. The said B-exposure device is illustrated in its operative position, as effected by the selector being placed in "B" position.

FIG. 9 is a view similar to FIG. 8, but showing the selector device in a non-automatic setting for effecting flash exposures, which setting is different from the setting for obtaining "B" exposures.

FIG. 10 is a diagrammatic representation of the intra-lens shutter structure of FIGS. 1 and 3, the various parts thereof being shown mostly in rear elevation. The automatic diaphragm setting mechanism is in its operative condition, being placed therein by virtue of the selector being positioned in the automatic position.

FIG. 11 is a view similar to that of FIG. 10 but showing the selector device positioned for the taking of flash exposures, with the diaphragm being manually operable.

One embodiment of the invention is illustrated in FIGS. 1, 2, 5, 8, 9, 10 and 11, whereas another embodiment embraces FIGS. 3, 4 and 7 taken with FIGS. 8, 9, 10 and 11. Considering both embodiments, the housing or case of the photographic camera is indicated by the numeral 1, such case having a front plate 1a, on which there is mounted a photographic intra-lens shutter.

Considering first the embodiment of FIGS. 1, 2, 5, 6 and 8–11, the intra-lens shutter assemblage carried by the front plate 1a is indicated by the numeral 2. The intra-lens shutter assemblage 2 may be mounted in any well-known manner, details of which are not shown here for the sake of clarity of illustration. Disposed in a rearward portion of the shutter assemblage 2 is an intra-lens diaphragm (to be described below) which is automatically settable in response to operation of a light intensity measuring device. Also built into the shutter assemblage 2 is an exposure time or shutter speed regulating device (described below in detail) of a well-known kind, which functions to enable different shutter speeds or exposure times to be obtained. Film sensitivity values are associated or correlated with a part of the range of shutter speeds, in such a manner that exposures may be effected successfully with the camera manually held by correlating particular or specific shutter speeds with specific film sensitivities which are available. In addition, as seen in FIG. 1, a front plate 3 is affixed in a well-known manner to the front portion of the shutter assemblage 2, the said front plate carrying on its conical outer jacket a setting or index mark 4 which is co-operable with a distance range scale 6 provided on a distance setting ring 5 of the lens assemblage 2.

In accordance with the present invention, the camera as illustrated herein is adaptable for taking pictures involving permanent light, as for example daylight, and also exposures involving flash lighting, a selection of either of such exposures being made by operation or actuation of a manually operable switch or selector means which is settable in either "automatic" or "flash" positions. By the invention, when the selector is set in the "flash" position, the speed regulating device of the camera is automatically adjusted to provide a speed setting which is suitable for flash exposures, as for example a shutter speed of 1/30 second, and the diaphragm is also arranged or switched so that it may be manually adjustable. Further, upon the said selector being placed in the "flash" setting, the diaphragm adjusting mechanism is settable or operable in response to movement of the selector member over a setting range with which there is associated a diaphragm scale.

The selector member or switch member is illustrated in FIGS. 1 and 2 as comprising a turnable setting ring 7 which is concentric with the optical axis of the camera and has a bearing (not shown) on the housing 8 of the shutter assemblage 2. The selector ring 7 includes a knurled knob or rim 7a. For setting purposes, the ring 7 has a setting mark 9 which is identified with the word "auto," and further has a diaphragm scale 10 which is provided with the symbols of a combustion flash bulb and an electronic flash. The electron flash symbol is in the form of a jagged arrow which is commonly used in other situations to designate a stroke of lightning. The mark 9 and the diaphragm scale 10 are referrable to an index setting mark 11 which is provided on the front plate 1a of the camera case 1.

The diaphragm, which is disposed in the rearward portion of the shutter assemblage 2, comprises a diaphragm setting ring 12 which has a bearing on the rear of the shutter housing 8, specifically on a bearing shoulder 8a of the same. The diaphragm mechanism further comprises a diaphragm actuating ring 13 which is disposed at the inside of the rear wall of the shutter housing 8. The diaphragm comprises sector-like members or segments 14 which have pin-and-slot connections 14a, 15 with the said actuating ring 13. Also, the diaphragm segments 14 have bearing pins 16b which extend into bores of a bearing plate which is fixedly attached to the inside of the rear wall of the shutter housing 8.

Two levers 16 and 17 serve to connect the rings 12, 13; the said levers may be tensionally connected (as by a uni-directional positive driving connection) to each other, utilizing a spring 18. The levers 16 and 17 are positioned about a common axis or shaft 19 carried on the diaphragm setting ring 12. The lever 16 has a pin-and-slot connection 16a, 20 with the actuating ring 13 of the diaphragm. To accommodate the pin 20 a clearance slot (not shown for reasons of clarity of illustration) is provided in the rear wall of the shutter housing 8, as will be understood. For the purpose of obtaining the desired adjusting characteristic of the diaphragm, the lever 17 has a pin 21 which engages and extends into a stationary cam slot 8b provided in the rear wall of the shutter housing.

Upon the selector ring or switch 7 being set at the automatic position, the two levers 16 and 17 are adjusted or shifted as a unit in response to the movement of the diaphragm setting ring 12 which is connected to a light intensity measuring device (described in detail below). The lever 16 engages a bent off tab or lug 17a of the lever 17 under the action of the spring 18 (FIG. 10).

If, on the other hand, the selector ring 7 is placed in the "flash" position, the lever 16 is moved with respect to the lever 17 against the action of the spring 18 when the diaphragm actuating ring 13 is adjusted or shifted with the diaphragm setting ring 12 retained in a starting position in a manner to be described in detail below. This condition and adjustment of the various components is illustrated in FIG. 11.

The light intensity measuring device which is associated with the diaphragm setting ring 12 comprises a movable sensing member 22 (which is shown in FIGS. 10 and 11 as being vertically movable), said member having a pin-and-slot connection 23, 22a with the diaphragm setting ring 12 and functioning to sense the position of the movable member or needle 28 (in a manner described below) of an exposure meter built into the camera. The movable sensing member 22 carries out its sensing function in response to actuation of a camera release member or plunger 25 which is movable against the action of a return spring 24. The sensing member 22 is biased by a spring 26 which tends to keep it in engagement with a collar 25a provided on the camera release plunger 25. The spring 26 is weaker than, and is accordingly overcome by the return spring 24 provided for normally holding the camera release in the raised position shown, so that prior to a setting operation of the sensing member 22 occupies the raised position shown in FIG. 10 (considering that the camera release 29 is not held depressed). To insure co-operation of the movable needle or member 28 of the measuring mechanism movement (which member may, for example include the moving coil of a well-known type galvanometer designated by the numeral 28x in FIGS. 10 and 11) the sensing member has a stepped edge 22b which is engageable with the needle 28 when the sensing member shifts under the action of the biasing spring 26 at the time that the camera release 25 is depressed. The needle 28 is movable over a stationary supporting surface 27 and may be either drivingly connected with or else carried by the movable coil of the galvanometer 28x. Prior to carrying out its sensing function, the needle 28 is clamped in its adjusted position in a well-known manner by means of a clamping device 29, 30. The clamping device comprises a lever 30 which is pivotally movable about an axis 29 and which engages, when the sensing member 22 is in its raised starting position, a pin 21 carried by the sensing member. The lever 30 is biased clockwise by a spring not shown in the drawing. In the raised or clockwise position of the clamping lever 30 the needle 28 is able to freely move over the support surface 27 so as to respond to the existing light conditions which cause energization of the galvanometer 28x. However, when the sensing operation is initiated by actuating or depressing the camera release plunger 25, the lever 30 first engages at its ribbed underside the needle 28, pressing or clamping the same against the fixed supporting surface 27. In order to obtain an initial movement of the sensing member 22 during which the clamping lever 30 may be operative to secure the needle 28 in its adjusted position without involving a maladjustment of the diaphragm, the latter when in its end or starting position is open somewhat more than that required for the maximum diaphragm value which, in the illustrated embodiment of the invention in FIGS. 1 and 2, is given as 2.8. In this manner the diaphragm may have a preliminary movement prior to reaching the 2.8 value, within which movement the clamping of the needle 28 is effected by the lever 30 at the time that the camera release plunger 25 is depressed.

For the purpose of rendering inoperative the automatic setting device for the diaphragm in response to positioning of the selector ring 7 in the setting position associated with flash exposures, the diaphragm setting ring 12 is retained in the starting position shown in FIG. 11 with said positioning of the selector.

For the purpose of effecting such retention, a lever 33 is provided, being pivotally movable about a pin 32 mounted on the rear wall of the shutter housing. The lever 33 co-operates at one end with the selector ring 7 and at its other end with a pin 34 provided on the diaphragm setting ring 12. This co-operation is such that, upon the selector ring 7 being set at the "automatic" position as shown in FIG. 10, the pin 33x of the lever 33, under the action of a spring 35 engaged with the lever, occupies a detent notch or recess 7b provided on an inwardly projecting portion of the selector ring. For this "automatic" position of the ring 7 and condition of the lever 33 the latter is disengaged from the pin 34 and remains outside of the range of movement of such pin. Accordingly, the lever 33 and the spring 35 will have no influence on the adjusting motion of the diaphragm setting ring 12.

When the selector ring 7 is placed in the setting position associated with the world "flash," as seen in FIG. 11, the pin 33x of the lever 33 is no longer engaged with the detent notch 7b but instead engages a concentric edge 7c provided on the ring 7, such edge having been shifted to this engaging position as clearly shown in FIG. 11. The lever 33 in obtaining the position of FIG. 11 will have pivoted clockwise under the action of its spring 35. This causes it to come into contact with the pin 34 of the diaphragm setting ring 12, thereby to retain the latter in the position which is required of it to enable the largest diaphragm aperture to be obtained by suitable adjustment of the ring 7, all as seen in FIG. 11.

For the purpose of adjusting the diaphragm when the selector 7 is shifted to the position or more properly the range indicated for the taking of flash exposures, there is provided on the ring 7 a cam 7d, with which the diaphragm actuating ring 13 can be connected. To establish such connection a bell crank 37 is provided, being carried on the rear wall of the shutter housing and being pivotal about an axis 36. One arm of the bell crank 37 has a pin-and-slot connection 38, 37a with the diaphragm actuating ring 13, and the other arm of the bell crank engages the camming edge 7d during the time that the selector ring 7 is occupying the "flash" setting range, as seen in FIG. 11. A clearance slot (not shown for reasons of clarity of illustration) is provided in the rear wall of the shutter housing 8, through which the pin 38 may extend.

The shutter speed or exposure time adjusting mechanism of the shutter assemblage comprises a gear train or escapement mechanism of a well-known type, which is provided in the shutter housing 8 (FIGS. 5 to 7). This mechanism comprises a lower or bottom bearing plate 39 which is affixed to a shutter base plate 41 by means of screws 40, as well as an upper or top bearing plate 42 connected to the said lower bearing plate. The actuating member of the mechanism comprises a pivotally movable toothed segment 43. One arm 43a of the segment 43 is shiftable into the path of movement of a bent-off lug 44a provided on a cocking and driving disk 44 of the shutter. The disk 44 is carried by the shutter base plate 41, being turnable about an axis 45 and being powered by a driving spring 46. The toothed segment 43 drives gears 47, 48 and 49 of the escapement device, which are indicated in dot-and-dash lines in FIGS. 5 to 7. Further details of the gear train 47, 48 and 49 are not shown herein, since this type of escapement is well known in the art. A restoring spring (not shown for the sake of clarity of illustration) tends to keep the gear escapement mechanism in the starting position shown in FIG. 6, wherein a pin 50 affixed to the toothed segment 43 engages one edge of the upper bearing plate 42.

In the embodiment of FIGS. 1, 2, 5, 6 and 8–11, the exposure time escapement mechanism is adjustable to effect different shutter speeds which are suited for manually taken photographs, considering different film sensitivities, and which are uniformly graduated over a range of values, by means of a speed setting ring 51 which is positioned on the front side of the shutter housing 8 and which is provided with a knurled rim 51a. To effect such settings, the exposure time setting ring 51 has a cam 51b which is shown in dot-and-dash lines in FIGS. 5 and 6 and by means of which the arm 43a of the toothed segment 43 can be placed in different starting positions with respect to the bent lug 44a of the driving disk 44 (shown in its starting position in the figures). This organization makes it possible to change the duration of engagement of the members 43a and 44a during the running down of the shutter, and hence change the magnitude of the escapement time and thus the "shutter speed" or duration of exposure.

For the purpose of connecting the cam 51b with the toothed segment 43 a two-armed lever 52 is provided, said lever being pivotally movable about an axis 53 provided on the upper bearing plate 42. When the selector ring 7 is placed in the "automatic" position the lever 52 engages, by means of its arm 52a, the cam 51b of the speed setting ring 51 under the action of a spring 54 which is stronger than and overcomes the restoring spring of the escapement mechanism. The other arm 52b of the lever 52 is engaged with the pin 50 of the toothed segment 43 (FIG. 5).

In order to position the exposure time setting ring 51 in the range of the above-mentioned exposure times which are are suitable for manually taken photographs considering various film speeds, a film sensitivity scale 540 comprising the values 12° to 24° is associated with the setting ring 51. The carrier for this scale is the shutter housing 8, whereas the setting mark 55 which cooperates with the scale is disposed on the exposure time setting ring 51.

The monotonously or uniformly graduated exposure time series which is suited for manually taken photographs may comprise, for example, the exposure times or shutter speeds of from 1/30 to 1/500 second. The times or values in this range are so correlated with the film sensitivity values of the scale 540 that the longest exposure time of 1/30 second is correlated with the lowest film sensitivity, i.e., with the value 12°, and the exposure times 1/125 second, 1/250 and 1/500 second are correlated with the values 18°, 21° and 24° respectively.

In contradistinction to the above described shutter, the shutter illustrated in the embodiment of FIGS. 3, 4 and 7 has no exposure time setting member corresponding to the ring 51; rather, when the selector ring 7 is set at the "automatic" setting in the embodiment of FIGS. 3, 4 and 7, the exposure time escapement mechanism is fixedly set at a specific exposure time suitable for manually taken photographs, as for example at 1/125 second. This will be explained in further detail when the embodiment of FIGS. 3, 4 and 7 is described below.

In order to set the above-described exposure time regulating device of FIG. 5 at an exposure time which is suitable for flash photographs, as for example an exposure time of 1/30 second, in response to positioning of the selector ring 7 at the "flash" position, the invention provides a device which is controlled by the selector ring 7 and by means of which the setting lever 52 in FIGS. 5 and 6 may be disconnected or rendered inoperative.

The said device comprises a lever 60 which is pivotally movable about an axis 61 located in a recess 8c provided in the side wall of the shutter housing 8. The lever 60 has a pin 62 as well as an arm 60a, by means of which it cooperates respectively with the selector ring 7 and with the setting lever 52. A cooperation is effected in such a manner that, upon the setting ring 7 being placed in the "automatic" position (see FIG. 5), a milled opening 7e of the selector ring is disposed adjacent the pin 62 of the lever 60 whereupon the said pin is able to move into the said opening or recess so as to not prevent the setting movement of the lever 52. This position is shown clearly in FIGS. 5 and 7.

When the selector ring 7 is placed in the setting range associated with the word "flash," the pin 62 of the lever 60 is shifted out of the opening or recess 7e and now engages the inner circumferential face of the selector ring. The lever 60 has thus been pivoted in a clockwise direction from the position of FIG. 5 to the position of FIG. 6, whereupon its arm 60a shifts the setting lever 52, against the action of the spring 54 which biases the latter, into the inoperative position shown in FIG. 6. In this position, the lever 52 is located outside of the path of movement of the toothed segment 43 of the escapement mechanism, so that the segment as influenced by the restoring spring of the escapement mechanism, occupies a position in which the pin 50 thereof engages the edge of the upper bearing plate 42 of the mechanism, as seen in FIG. 6. For this position of the segment 43, the escapement mechanism is set at an exposure time which is suitable for flash exposures, as for example 1/30 second.

The setting of the exposure time setting ring 51 in the shutter as constructed in accordance with FIG. 1, is not influenced by the above-described setting of the exposure time regulating device in the position of 1/30 second suitable for flash photographs, so that there is no change in the film sensitivity setting. For the purpose of setting B-exposures, the selector ring 7 has, in addition to the above-described setting positions of "auto" and "flash," an additional setting position identified by the letter "B," with which a diaphragm scale 63 (corresponding to the scale 10) is associated. In response to the selector ring 7 being set the "B" position, a well-known device for obtaining "B"-exposures is rendered operative, and additionally the diaphragm is operable for manual adjustment.

The "B"-device of the shutter is illustrated in FIGS. 8 and 9, and comprises a lever 64 which is pivotally shiftable about an axis 65 provided on the shutter base plate 41, said lever being biased in a clockwise direction by a spring 66. One arm 64a of the lever 64 carries a detent lug 64b which co-operates with a projection 44b provided on the driving disk 44 in the manner shown in FIG. 8. The other arm 64c of the lever 64 engages under the action of the spring 66, a pin 67 of the shutter release lever 68. The release lever 68 is pivotally movable about an axis 69 provided on the shutter base plate 41, and serves to actuate a detent lever 70 which retains the driving disk 44 of the shutter in its cocked position. The detent lever 70 is pivotally movable about an axis 71 carried by the shutter base plate, and has on both ends bent lugs 70a and 70b, by means of which it cooperates under the action of the spring 72, with the projection 44b of the driving disk 44 or with a release lever 68, in the manner shown in FIG. 9.

A lever 74 which is pivotally movable about an axis 73 carried on the shutter base plate 41 serves to control the "B"-lever 64. The shape of the lever 74 is clearly shown in FIGS. 8 and 9. One arm 74a of the lever projects through a clearance opening provided in the side wall of the shutter housing 8, said arm co-operating with the selector ring 7, whereas another arm 74b of the lever 74 is adapted to cooperate with the detent of "B"-lever 64.

When the selector ring 7 is in the setting positions of "auto" and "flash," the arm 74a of the lever 74 engages under the action of a spring 75, the inner circumferential face of the ring 7, and the other arm 74b of the lever 74 is disposed in the path of movement of a projection 64b provided on the detent lever 64. This has the effect of retaining the detent lever 64 against the action of its spring 66, upon the release lever 68 being actuated, in a position in which the lug 64b is disposed outside of the path of movement of the projection 44b of the driving disk 44 of the shutter (FIG. 9).

However, when the selector ring 7 is placed in the setting position associated with the symbol "B," a milled opening 7f provided on the selector ring 7 is located opposite the arm 74a of the lever 74, the length of the said recess 7f corresponding to the extent of the diaphragm setting range. This makes it possible for the lever 74 to move, under the action of the spring 75, into a position shown in FIG. 8 wherein its arm 74b is located outside of the path of movement of the projection 64d of the B-arresting or detent lever 64. If the shutter is now released, the detent lever 64 will pivotally shift in response to the actuation of the release lever 68 and under the action of the spring 66, in a clockwise direction whereby the arresting lug 64b thereof is disposed in the path of movement of the projection 44b of the driving disk 44. The projection 44b thus retains the driving disk after the latter has been released by the arresting lever 70, in a position corresponding to the open position of the shutter blades. The release of the retained driving disk 44 is effected by releasing the lever 68, whereby the spring 76 now overcomes the spring 66 of the detent lever 64 and accordingly returns the same to the starting position shown in FIG. 9.

In order to set the diaphragm in the case of B-exposures, the selector ring 7 is provided with a cam 7g which corresponds to the flash setting cam 7d but which is arranged in an opposite sense with respect to the latter. The lever 37 which is connected to the diaphragm actuating ring 13 is co-operable with the cam 7g.

In FIGS. 10 and 11, the exposure meter is shown as comprising a galvanometer 28x, connected in circuit with a photoelectric cell P and with an adjusting resistor or rheostat R. Electrical exposure meters of this type are well known, and further details are not given herein for the sake of brevity.

The embodiment of the invention illustrated in FIGS. 3, 4, 7 and 8–11 differs from the above-described embodiment of FIGS. 1, 5 and 6 in that there is no exposure time setting member corresponding to the ring 51. Instead, when the selector ring 7 in FIG. 7 is set at "auto" the exposure time escapement mechanism is fixedly set at a specific exposure time suitable for manually taken photographs, as for example a speed of $\frac{1}{125}$ second. The setting of the film sensitivity, in the embodiments of FIGS. 3, 4 and 7, is effected by means of a usual or well-known setting member (not shown) arranged on the camera case. In a well-known manner the said setting member serves the purpose of bringing about a change in the position of the measuring mechanism needle with respect to the sensing member, to effect a change in the film sensitivity. This can be done, for example, in a well-known manner by rotatable adjustment of the measuring mechanism (galvanometer 28x) or by a shading or screening of the photo-cell P shown in FIGS. 10 and 11. In FIGS. 3, 4 and 7 parts which are similar to those already described have been given like numbers.

In FIG. 7, a lever 56 is shown, which is similar to or the same as the lever 52 illustrated in FIGS. 1, 5 and 6. The lever 56 is used for adjusting the exposure time escapement mechanism, said lever being pivotally mounted about the axis 53 carried by the upper bearing plate 42 of the escapement mechanism and being biased in a clockwise direction by the spring 54 which overcomes the restoring spring of the escapement mechanism and which, upon the selector ring 7 being placed in the automatic position causes the lever 56 to engage at one end a stationary stop pin 59 and at the other end the pin 50 provided on the toothed segment 43. This method has the effect that upon the selector ring 7 being placed in the "automatic" position, the exposure time escapement mechanism is always in the same setting position, wherein the above-mentioned exposure time of $\frac{1}{125}$ second suitable for the taking of pictures with the camera manually held, is obtained.

Thus the structures illustrated in FIGS. 3, 4 and 7 are to be taken in conjunction with the structures of FIGS. 8–11, replacing the structures of FIGS. 1, 2, 5 and 6. That is, the second embodiment of the invention is illustrated by FIGURES 3, 4, 7 and 8–11 whereas the first embodiment described above in detail is illustrated by FIGS. 1, 2, 5, 6 and 8–11.

It will be understood that in the embodiment of FIGS. 3, 4, 7, etc. the setting lever 56 replaces the lever 52 already described above in connection with FIGS. 1, 2, 5 and 6. The control lever 60 in FIG. 7 renders inoperative the setting lever 56, just as in FIGS. 5 and 6 the control lever 60 renders inoperative the setting lever 52. The lever 60 is under the control of the selector ring 7, just as already described above. When the selector ring 7 is set at the "automatic" position, the milled opening or recess 7e thereof shown in FIG. 7 is located at the lever 60 and provides clearance whereby the lever may shift into the opening so as to not prevent the setting movement of the lever 56. This is shown clearly in FIG. 7. When the selector ring 7 is placed in the setting position associated with the word "flash," the recess 7e is shifted to a point removed from the lever 60 whereby the latter is shifted clockwise and becomes engaged with the inner circumferential face of the selector ring 7. Thus, the arm 60a of the lever 60 moves the setting lever 56 against the action of the spring 54 which influences the latter to move the same into an inoperative position similar to that shown in FIG. 6. For such position, the setting lever 56 is located outside of the pivotal range of movement of the toothed segment 43 of the escapement mechanism, so that the segment as influenced by the restoring spring of the escapement mechanism, occupies a position in which the pin 50 thereof engages the edge of the upper bearing plate 42 of the escapement mechanism. In this position the escapement mechanism is set at an exposure time suitable for flash exposures, as for example $\frac{1}{30}$ second.

The mode of action and the manner of operating the above described camera is as follows.

(a) *Setting of Film Sensitivity*

Such a setting of the camera shown in FIGS. 1, 5 and 6 is effected by adjustment of the setting ring 51, after release of a usual type of detent or locking device 77 (FIG. 1), to bring the setting mark 55 opposite the sensitivity value of the film being used, on the scale 54θ. The exposure-time escapement mechanism of the shutter is thereby set, by means of the cam 51b of the ring 51 and the lever 52, at the exposure time which is to be associated with the film sensitivity designated. The carrying out of the said setting is independent of the respective setting position of the selector ring 7.

(b) *Effecting an Exposure With Automatic Diaphragm Setting*

For this purpose, the selector ring 7 is set at the position shown in FIG. 10, wherein the setting mark 9 provided on the ring and identified by the word "auto" is located opposite the stationary index mark 11.

If the camera release plunger 25 is now depressed, this motion is followed by the sensing member 22 and by the the setting ring 12 connected to the sensing member, these being under the action of the spring 26. During such operation the measuring mechanism needle 28 is first clamped by the lever 30 against the fixed table surface 27. The adjusting movement of the setting ring 12 is transmitted to the actuating ring 13 of the diaphragm by means of the levers 16 and 17, these two levers shifting as a unit without relative movement between them. At the same time, the guide slot 8b imparts to the said pair of levers the pivoting movement required for obtaining the prescribed adjusting characteristic of the diaphragm. The automatic setting of the diaphragm is completed when one of the steps 22b of the sensing member 22 strikes and engages the measuring mechanism needle 28. Upon further depressing movement of the release member 25, the shutter is released by means of the levers 68 and 70 which unlock or free the cocked driving disk 44, and an exposure is effected.

(c) *Carrying Out a Flash Exposure*

This is done by positioning the selector ring 7, using the setting mark 11, at a diaphragm value which is associated with the type of flash bulb used and the photographic range or distance, utilizing the diaphragm scale 10. Upon effecting this setting, the concentric edge 7c of the selector ring 7 is located adjacent the lever 33, so that independent of any depressing movement of the release lever 25, the setting ring 12 is retained by means of the lever 23 in its starting position which is required for obtaining the maximum diaphragm aperture and which is determined by a stop 78, this occurring since the spring 35 of the lever 33 is sufficiently strong to overcome the spring 26 of the sensing member 22. Further, upon the said positioning of the selector ring 7, the cam 7d thereof comes into engagement with the lever 37 and pivots the latter in a counterclockwise direction whereby the diaphragm is adjusted to the value set or indicated on the scale 10. This is shown in FIG. 11. Furthermore, upon the said positioning of the selector ring 7, the exposure-time escapement mechanism is adjusted for an exposure time which is suitable for the taking of flash exposures without there being any change in the position of the exposure time setting ring 51. This occurs by virtue of the fact that the lever 60 which cooperates with the setting lever 52 (FIGS. 5 and 6) is pivoted, from the positions shown in FIGS. 5 and 7 and associated with the "automatic" position of the switch or selector ring 7, by the selector ring 7 into the position shown in FIG. 6, wherein the lever 60 retains the setting lever 52 in a position located outside of the range of movement of the toothed segment 43 of the escapement mechanism. This causes the toothed segment 43 to engage by means of its pin 50 an edge of the upper bearing plate 42 of the escapement mechanism, whereby the latter is now set at an exposure time which is suitable for flash exposures, as for example a time of 1/30 second.

(d) Carrying Out B-Exposures

For this purpose, the selector ring 7 is set utilizing the stationary index mark 11, at the desired diaphragm value on the diaphragm scale 63 which is associated with the symbol "B." When this setting is effected, the retention of the diaphragm setting ring 12 as effected by the lever 33 in co-operation with the pin 34 is had, and the automatic diaphragm setting mechanism is rendered inoperative. Further there is no change as regards the setting of the exposure time escapement mechanism in connection with the "flash" setting of the selector ring 7. On the other hand, if the shutter is switched to "B"-exposures by the selector ring 7, the previously described B-device is released to become operative. This is effected by virtue of the fact that when the selector ring 7 is moved into the "B" position, the lever 74 is pivoted from the position shown in FIG. 9 (which is associated with the positions "auto" and "flash" of the selector ring) into the position shown in FIG. 8 wherein the arm 74b of the lever releases the detent lever 64 so that the latter, in response to actuation of the release lever 76 retains the driving disk 74 of the shutter in the position associated with the open condition of the shutter blades after the shutter has been released by the arresting lever 70. Such open position is retained until the release lever 76 is again let go of or released.

Consequently, the setting of the camera for B-exposures requires only a single manipulation, namely the setting of the selector ring 7 at the diaphragm value desired, which is associated with the symbol "B" on the diaphragm scale 63.

Summarizing, it can be stated that a camera constructed in accordance with the invention has an optimally simple, clear and rapid mode of operation, and is characterized by a wide range of usefulness.

I claim:

1. In a photographic camera of the type wherein the diaphragm is automatically adjusted by a light intensity measuring device and the exposure time setting device is correlated with a film sensitivity scale to provide, for the various film sensitivity values, shutter speeds suitable for manually-taken photographs, the combination of a selector means settable in either an "automatic" position or a "flash" range; means responsive to placing the selector means in the "flash" range, for adjusting the exposure time mechanism to provide a shutter speed suitable for flash exposures; means responsive to placing the selector means in the "flash" range, for rendering inoperative the automatic adjustment of the diaphragm; means responsive to placing the selector means in the "flash" range, for connecting the diaphragm adjusting mechanism to the said selector means for manual diaphragm adjustment thereby as the selector means is adjustably shifted while in the flash range setting; and a diaphragm scale associated with the said selector means for use when the latter is in the "flash" range.

2. A camera as in claim 1, in which the selector means has a third, "B" range different from the "automatic" position and the "flash" range, in which there are means responsive to placing the selector means in the "B" range, for rendering operative a B-exposure device, in which there are means responsive to placing the selector means in the "B" range, for connecting the diaphragm adjusting mechanism to said selector means for manual diaphragm adjustment thereby as the selector means is adjustably shifted while in the "B" range, and in which there is a diaphragm scale separate from the first-mentioned diaphragm scale and associated with the selector means for use when the latter is in the "B" range.

No references cited.